United States Patent [19]

Whiting, Jr.

[11] 4,268,531
[45] May 19, 1981

[54] CONDIMENT PACKAGE AND MATERIAL FOR MAKING SAME

[75] Inventor: Philip C. Whiting, Jr., Holyoke, Mass.

[73] Assignee: Ludlow Corporation, Needham Heights, Mass.

[21] Appl. No.: 740,429

[22] Filed: Nov. 10, 1976

[51] Int. Cl.³ .................. B65D 65/40; B65D 85/72
[52] U.S. Cl. ................................. 426/126; 206/484; 428/500; 428/476.3; 428/476.9
[58] Field of Search ............... 426/115, 126, 127, 410, 426/129, 130, 415; 428/474, 500; 206/484

[56] References Cited

U.S. PATENT DOCUMENTS

| | | | |
|---|---|---|---|
| 3,453,661 | 7/1969 | Repko | 426/115 X |
| 3,502,541 | 3/1970 | Hermitte et al. | 426/126 X |
| 3,616,190 | 10/1971 | Shaw | 426/126 X |
| 3,791,915 | 2/1974 | Goehring et al. | 428/474 |
| 3,949,135 | 4/1976 | Vercauteren | 426/127 X |

OTHER PUBLICATIONS

Southwick, Jr., C. *Polyethylene-coated Cellophane* in *Modern Packaging*, Mar. 1954, pp. 203-208.

Primary Examiner—William A. Cuchlinski, Jr.
Attorney, Agent, or Firm—Robert A. Cesari; John F. McKenna; Andrew F. Kehoe

[57] ABSTRACT

A packaging material, and especially condiment-carrying packages prepared therefrom, which is characterized by its thinness and consequent ease of handling. Moreover, condiments packaged therein have greatly extended storage life. In general, the package comprises using a relatively thin coating formed of an ionomer and a polyethylene of relatively low softening point, this coating conveniently being coextruded and incorporated into a laminated structure which will normally also comprise layers of cellophane and aluminum foil.

7 Claims, 3 Drawing Figures

CONDIMENT PACKAGE AND MATERIAL FOR MAKING SAME

BACKGROUND OF THE INVENTION

One of the more difficult packaging problems is that related to packaging of condiments such as ketchup, mustard and the like. Not only must the package be attractive and resistant to chemical attack, but it must be free of substances which affect flavor. Normally such packaging comprises several layers to achieve the necessary properties. However, the very need to use the several layers (which typically include printable plys, metal plys and various adhesion-promoting coats and other barrier-layers such as acid-barrier layers) makes the resultant laminated less flexible than is optimum for handling on automatic packaging and heat-sealing apparatus.

The prior art is replete with attempts to provide improved webs for use in condiment packaging. One of the more successful materials has been a web formed of the following:
- Printed cellophane
- White-pigmented, low-density polyethylene (10% titanium dioxide pigment)
- Aluminum foil
- urethane adhesive
- 0.002 inch layer of medium density polyethylene This is typical of those condiment packages which required a printable surface, a metallic foil barrier and a heat-sealable backing ply.

SUMMARY OF THE INVENTION

It is an object of the invention to provide an improved condiment package which assures longer shelf life for the condiment.

It is a further object of the invention to provide an improved packaging material, one which is easier to handle on package-manufacturing equipment and one which - on being formed into a package - is easier for the condiment consumer to open.

Other objects of the invention will be obvious to those skilled in the art on their reading this application.

The above objects have been achieved with surprising success in the area of packages and packaging materials comprising
(1) a printable surface ply
(2) a metallic foil ply
(3) a heatsealable ply In many applications, it is also necessary to utilize an acid-barrier layer. In the prior art, this has most often been a polyurethane-based adhesive coated between the foil and heatsealable ply.

The improvement according to the invention is primarily the surprising advantage gained by replacement of the conventional heatsealable ply of middle density polyethylene (usually about 0.002 inches thick) with a relatively thin coating of ionomer and low density polyethylene. The relatively thin coating is conveniently co-extruded onto the metal foil with the co-extruded layer comprising about 7 lbs. per 3000 feet$^2$ of the ionomer and 10 lbs per 3000 feet$^2$ of the polyethylene. The total thickness of the web is only about 1.2 mils thick. One advantage of the invention is that the ionomer acts as an excellent acid barrier as well as a part of the heat-sealable ply. Moreover, the ionomer has excellent bonding characteristics to aluminum foil and, consequently, the urethane adhesive of the prior art can be eliminated. In those applications where an even better bond to foil is required, a relatively inexpensive acrylic primer may be used.

The resulting product is less expensive to manufacture, more easily handled on packaging apparatus, more easily manipulated in use by a consumer, and, most importantly, exhibits a surprising advantage in shelf life when used with such acidic condiments as tomato ketchup and the like.

The particular advantages of the above-identified package have been widely noted and the improved combination of handling ease and chemical resistance has also been found to be of particular advantage in the handling of liquid detergent and soap compositions. In this context, liquid is meant to include tube-extrudable gel and paste compositions. When the invention is used in connection with such packaging it is often desirable to utilize a coextruded, innermost, heatsealable ply which is up to 0.003 inches in thickness.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be suited in the condition of a particular case.

Figure 1:
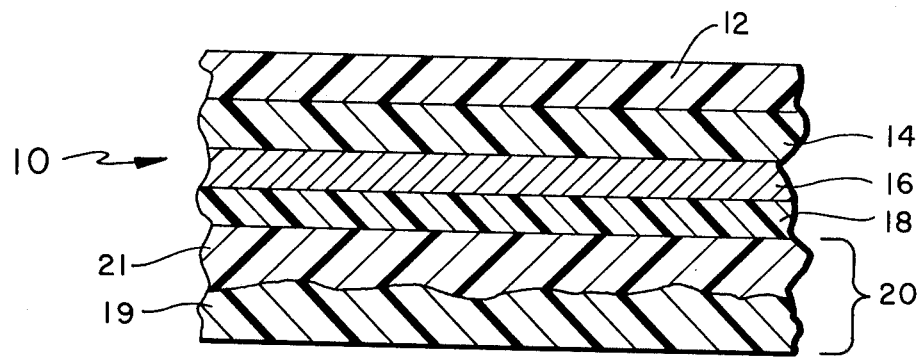
FIG. 1 is a schematic diagram of one embodiment of the web of the invention.

FIG. 1 illustrates a packaging material 10 formed of a printed cellophane layer 12; a TiO$_2$-pigmented, medium-density, polyethylene layer 14 (typically about 0.0007 inches thick and primarily used as an adhesive but also to improve the appearance of a package); a layer 16 of 0.00035 inch aluminum foil; a very thin coating 18 of an acrylic primer; and a coextruded layer 20 of an ionomer 21 (7 lbs per 3000 ft$^2$) and low density polyethylene 19 (10 lbs per 3000 ft$^2$).

The material according to FIG. 1 was formed into a heatsealed package comprising a typical commercial ketchup product. This package was then placed in an oven at 120° F. and aged for thirty weeks. At the end of this period, there was substantially no change in the package. A control package formed of conventional material, i.e. one comprising the usual polyurethane acid barrier and 2-mil thick medium density polyethylene layer, delaminated within three weeks in the same environment using the same ketchup.

The acrylic primer used was that sold by Miller Process Company of New York City under the designation 087E. The ionomer is obtained from DuPont under the trade designation Surlyn 1652.

It is to be understood that the material on the printed side of the foil can be any visually-acceptable material including paper. Moreover, the foil can be replaced with any very thin flexible, functionally-acceptable, barrier layer, albeit the economic considerations usually dictate aluminum.

Figure 2:
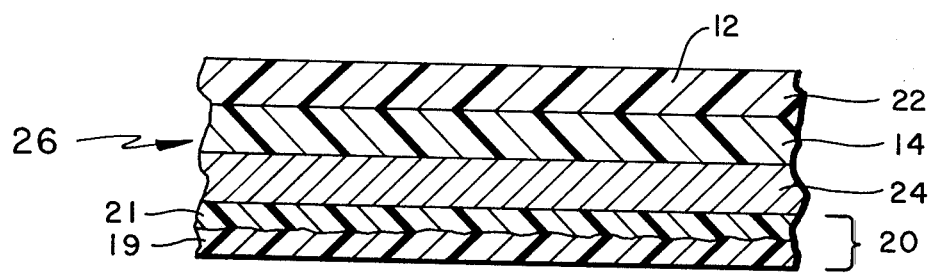
FIG. 2 is a schematic diagram of an alternative packaging material.

FIG. 2 illustrates another material 26 similar to that of FIG. 1 except that no acrylic primer is used and the cellophane and white polyethylene is replaced with a paper sheet 22 adhesively bonded to foil 24.

Figure 3:
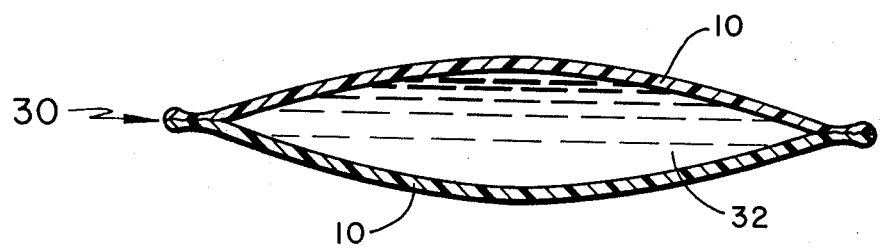
FIG. 3 is a section package constructed according to the invention.

FIG. 3 illustrates a pouch formed of the material of the invention, Package 30 comprises ketchup 32 enclosed within two heatsealed laminate sheets.

By ionomer is meant that class of polymer in which ionized carboxyl groups create ionic crosslinks in the intermolecular structure. Extrusion coating or film grades are preferable for use.

It is also to be understood that the following claims are intended to cover all of the generic and specific features of the invention herein described and all statements of the scope of the invention which might be said to fall therebetween.

What is claimed is:

1. In a package comprising a condiment and formed of a flexible, heatsealable web consisting of
   (1) an outer printable surface ply
   (2) a metallic foil ply and
   (3) an innermost heat-sealable ply in contact with said condiment
   the improvement wherein said innermost ply is less than about 0.0015 inches in thickness and is formed of
   (a) an ionomer making up a minor portion of said thickness and placed nearest said foil,
   (b) low density polyethylene forming the major portion of said thickness and placed remote from said foil.

2. A package as defined in claim 1 comprising an acrylic polymer priming coat between (a) said metal foil and (b) said ionomer.

3. A package as defined in claim 1 which comprises ketchup enclosed therewithin, said ketchup contacting only said heatsealable layer.

4. A laminate formed of a flexible, heatsealable web consisting of
   (1) an outer printable surface ply
   (2) a metallic foil ply and
   (3) an third heatsealable ply
   the improvement wherein said third ply is less than about 0.0015 inches in thickness and is formed of
   (a) an ionomer making up a minor portion of said thickness and placed nearest said foil.
   (b) low density polyethylene forming the major portion of said thickness and placed remote from said foil.

5. A laminate as defined in claim 4 comprising an acrylic polymer priming coat between said metal foil and said ionomer.

6. A laminate as defined in claim 4 wherein said third ply is less than about 0.003 inches thick.

7. A package comprising, as the packaging material, a sheet as defined in claim 4 and comprising, as the packaged material, a liquid detergent composition.

* * * * *